(12) United States Patent
Bar

(10) Patent No.: US 7,708,036 B2
(45) Date of Patent: *May 4, 2010

(54) HEAD FOR A FUEL FILLER PIPE OF A VEHICLE

(75) Inventor: Jean-Philippe Bar, Auneuil (FR)

(73) Assignee: ITW DE France, Beauchamp (FR)

( * ) Notice: Subject to any disclaimer, the term of this patent is extended or adjusted under 35 U.S.C. 154(b) by 369 days.

This patent is subject to a terminal disclaimer.

(21) Appl. No.: 11/426,930

(22) Filed: Jun. 27, 2006

(65) Prior Publication Data

US 2006/0289083 A1 Dec. 28, 2006

(30) Foreign Application Priority Data

Jun. 28, 2005 (FR) ................................... 05 06577

(51) Int. Cl.
*B65D 43/16* (2006.01)
*B65B 3/04* (2006.01)
(52) U.S. Cl. ...................................... 141/350; 220/86.2
(58) Field of Classification Search ......... 141/348–350, 141/368; 220/86.1–86.2
See application file for complete search history.

(56) References Cited

U.S. PATENT DOCUMENTS

| | | | | |
|---|---|---|---|---|
| 3,478,922 | A | * | 11/1969 | Mole .......................... 220/86.2 |
| 4,714,172 | A | * | 12/1987 | Morris ....................... 220/86.2 |
| 4,760,933 | A | * | 8/1988 | Christner et al. ........... 220/86.2 |
| 4,805,226 | A | | 2/1989 | Guebey |
| 4,924,923 | A | * | 5/1990 | Boehmer et al. ............. 141/350 |
| 4,977,936 | A | * | 12/1990 | Thompson et al. ......... 220/86.2 |
| 5,027,868 | A | * | 7/1991 | Morris et al. ............... 220/86.2 |
| 5,385,179 | A | * | 1/1995 | Bates et al. .................. 141/350 |
| 5,435,358 | A | * | 7/1995 | Kempka et al. ............. 141/349 |
| 5,690,153 | A | * | 11/1997 | Steinkaemper et al. ...... 141/348 |
| 5,732,840 | A | * | 3/1998 | Foltz .......................... 220/86.2 |
| 5,860,460 | A | * | 1/1999 | Hidano et al. .............. 220/86.2 |
| 5,887,615 | A | | 3/1999 | Goto et al. |
| 6,446,826 | B1 | * | 9/2002 | Foltz et al. ................. 220/86.2 |
| 6,945,290 | B1 | * | 9/2005 | Benjey et al. ............... 141/350 |

(Continued)

FOREIGN PATENT DOCUMENTS

DE 4039269 C1 2/1992

(Continued)

OTHER PUBLICATIONS

Joseph Fornuto et al.: "Fuel filler cap" Research Disclosure, Mason Publications, Hampshire, GB, vol. 352, No. 59.

*Primary Examiner*—Gregory L Huson
*Assistant Examiner*—Nicolas A Arnett
(74) *Attorney, Agent, or Firm*—Lowe Hauptman Ham & Berner LLP

(57) ABSTRACT

An obturating assembly includes a body having an aperture for passage to the pipe of a fuel supply spout of predetermined outer diameter and an obturator that is moveable with respect to the body. In accordance with the invention, the head further includes an access assembly having a shell through which the spout must pass before reaching the obturator, the shell having a plurality of flexible tabs generally forming an assembly of funnel shape of which the minor diameter is less than the outer diameter of the spout and of which the major diameter is greater than the outer diameter of the spout.

23 Claims, 5 Drawing Sheets

U.S. PATENT DOCUMENTS

| | | | |
|---|---|---|---|
| 7,011,121 B2 * | 3/2006 | Bar et al. | 141/350 |
| 7,082,973 B2 * | 8/2006 | Ganachaud et al. | 141/350 |
| 7,096,899 B2 * | 8/2006 | Vetter et al. | 141/350 |
| 7,147,018 B2 * | 12/2006 | Krach et al. | 220/86.2 |
| 7,163,037 B2 * | 1/2007 | Walkowski | 141/350 |
| 7,182,111 B2 * | 2/2007 | McClung et al. | 141/349 |
| 7,191,810 B2 * | 3/2007 | Ganachaud et al. | 141/350 |
| 7,293,586 B2 * | 11/2007 | Groom et al. | 141/350 |
| 7,302,977 B2 * | 12/2007 | King et al. | 141/350 |

FOREIGN PATENT DOCUMENTS

| | | |
|---|---|---|
| DE | 10222097 A1 | 2/2004 |
| EP | 0190727 A1 | 8/1986 |
| EP | 0581632 A1 | 2/1994 |
| EP | 0597314 A1 | 5/1994 |
| EP | 0612639 A1 | 8/1994 |
| EP | 1555154 A | 7/2005 |
| FR | 2759035 A1 | 8/1998 |
| FR | 2860454 A | 4/2005 |
| JP | 01226431 A | 9/1989 |
| JP | 07237459 A | 9/1995 |
| JP | 08127256 A | 5/1996 |

* cited by examiner

HEAD FOR A FUEL FILLER PIPE OF A VEHICLE

The present application is based on, and claims priority from, French Application Number 0506577, filed Jun. 28, 2005, the disclosure of which is hereby incorporated by reference herein in its entirety.

The invention relates to the filling of vehicles with fuel, and more particularly to the filler pipe heads provided to cooperate with the spout at the end of a fuel supply nozzle.

Such heads are already known in which the spout can penetrate simply by thrusting in, and that are provided with an obturating assembly comprising:
- a body having an aperture for passage to said pipe of a fuel supply spout of predetermined outer diameter; and
- an obturator movable with respect to said body, able to assume an obturating position in which it conceals said passage aperture and a freeing position in which it does not conceal said passage aperture, said obturator flapping rearwardly and outwardly between said obturating position and said freeing position, said obturator being elastically urged towards said obturating position, said obturator being adapted to be driven by said spout from the obturating position to the freeing position when said spout meets the obturator during a thrusting movement of the spout into the head.

The invention is directed to such a filler head that is simple and convenient to use while providing an arrangement that is economical to implement.

To that end it provides a head characterized in that it further comprises an access assembly having a shell through which the spout must pass before reaching the obturator, said shell having a plurality of flexible tabs generally forming an assembly of funnel shape of which the minor diameter is less than said outer diameter of said spout and of which the major diameter is greater than said outer diameter of said spout.

Thrusting in of the spout from the front to the rear causes flexing of the tabs, which move apart from each other to allow the spout to pass. When a movement of withdrawal (rear to front) is imparted to the latter, the tabs are moved by the spout and press strongly against it, so producing a braking effect to the withdrawal of the spout.

When the obturator comes to act on the end of the spout by exerting a force relatively abruptly in the direction of the withdrawal, the rubbing of the tabs against the spout gives a braking effect which avoids the spout being subject to an ejection effect.

According to preferred features, for reasons of simplicity and convenience with regard both to manufacture and to use:
- said shell comprises a side wall the general form of which is tubular with a circular section, said flexible tabs being attached at the major diameter end of the funnel-shaped assembly which they form;
- the minor diameter end of the funnel-shaped assembly formed by said tabs is at the same level as the rear end of said side wall;
- said flexible tabs are connected to said side wall exclusively at the major diameter end of said funnel-shaped assembly;
- each said flexible tab is of substantially constant thickness, said side wall having a similar thickness;
- said access assembly further comprises a cover and a shell support, with, in the assembled state of the access assembly, said shell being disposed in said support and with said support being disposed in said cover, the major diameter end of said funnel-shaped assembly formed by said flexible tabs facing an aperture of said cover whereas the minor diameter end of said funnel-shaped assembly faces an aperture of said shell support, the latter aperture being adapted to allow the passage of said spout;
- there is play between said shell and said shell support; and/or
- said cover comprises at the rear a skirt of step form provided with tongues for snap-fitting onto said access assembly and/or onto said pipe According to other features preferred for reasons of simplicity and convenience, with regard both to manufacture and to use:
- said body comprises a separating wall disposed within a side wall;
- said separating wall has a periphery connected in entirety to said side wall;
- the general form of said side wall is tubular with a circular section;
- said body has guide means for guiding said spout towards said passage aperture;
- said guide means comprise at least one member projecting from the perimeter of said passage aperture towards the front end of said body;
- a said member projects from a portion of the perimeter of said passage aperture that is the closest to the front end of said body;
- a said member projects from a portion of the perimeter of said passage aperture that is the furthest from the front end of said body;
- at least one said member has an inner surface connected to the edge of said passage aperture.

According to other preferred features, for the same reasons:
- the head further comprises an obturator support engaged within and fixed to said body, said support being provided with means for flap mounting of said obturator;
- said flap mounting means are disposed in the vicinity of the front end of the support and are aligned with a chord close to its periphery;
- said support has an opening facing said mounting means adapted to house a closure which the obturator comprises;
- said flap mounting means of the obturator comprise two bosses and two apertures provided in said bosses and in a side wall of said support;
- said body comprises a separating wall disposed within a side wall; and the front end of said support is formed like said separating wall;
- said obturator comprises lugs for flap mounting, a hinge pin is engaged in said flap mounting means of said support and in said lugs, and a helical central portion of a spring is disposed around said hinge pin between said lugs, respective projecting portions of said spring bearing respectively on said obturator and on said body; and/or
- said body and said support have mutual snap-fitting means.

The explanation of the invention will now be continued with the detailed description of a preferred embodiment, given below by way of non-limiting example, with reference to the accompanying drawings. In the drawings.

Figure 1:
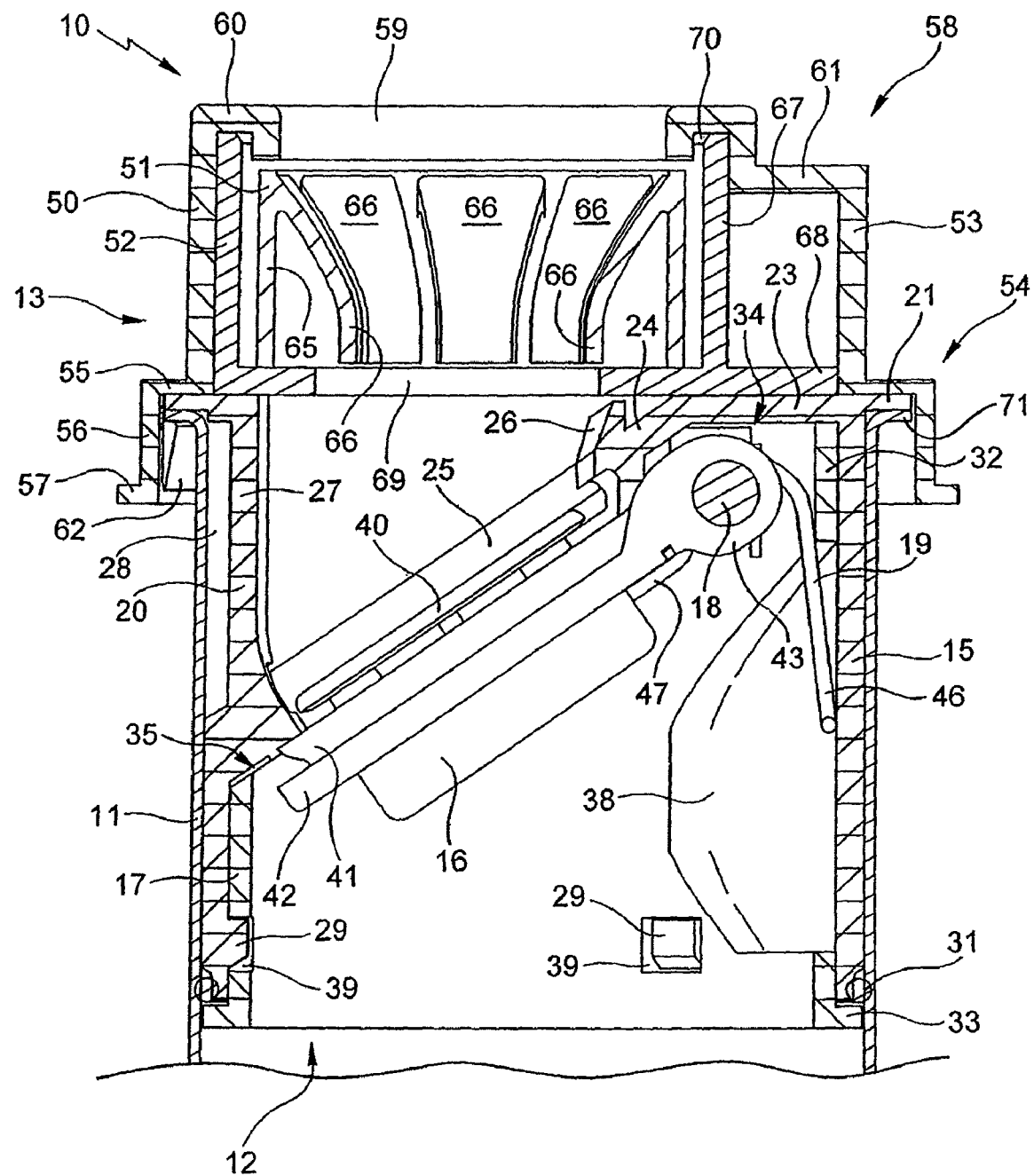
FIG. 1 is a section view of a head for a fuel filler pipe of a vehicle, shown mounted on such a pipe.
Figure 2:
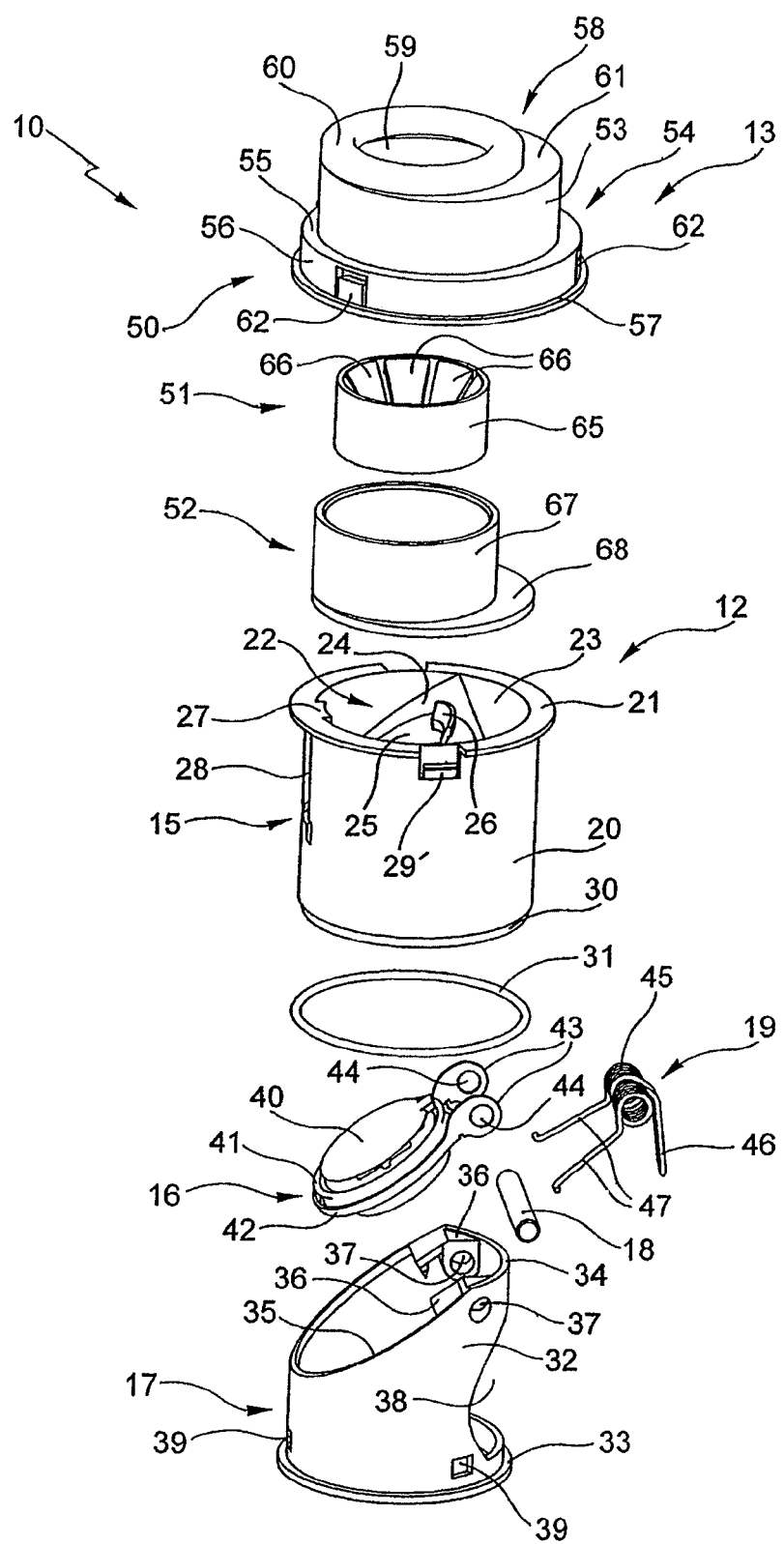
FIG. 2 is an exploded perspective view of the filler head illustrated in FIG. 1.
Figure 3:
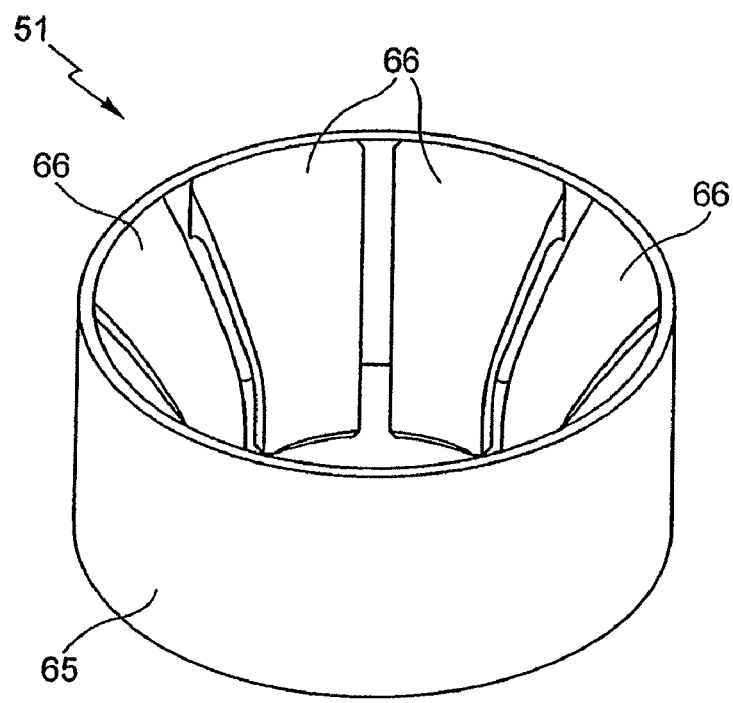
Figure 4:
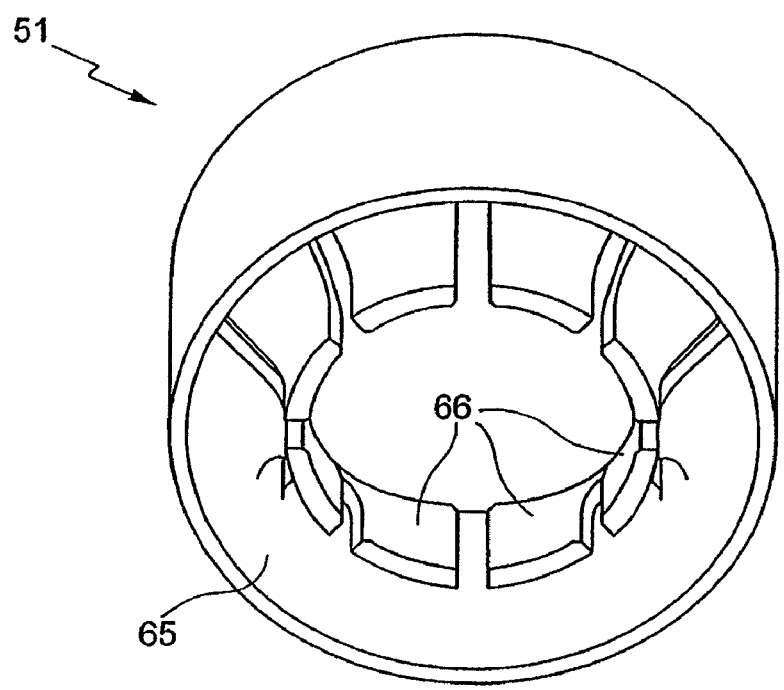
Figure 5:
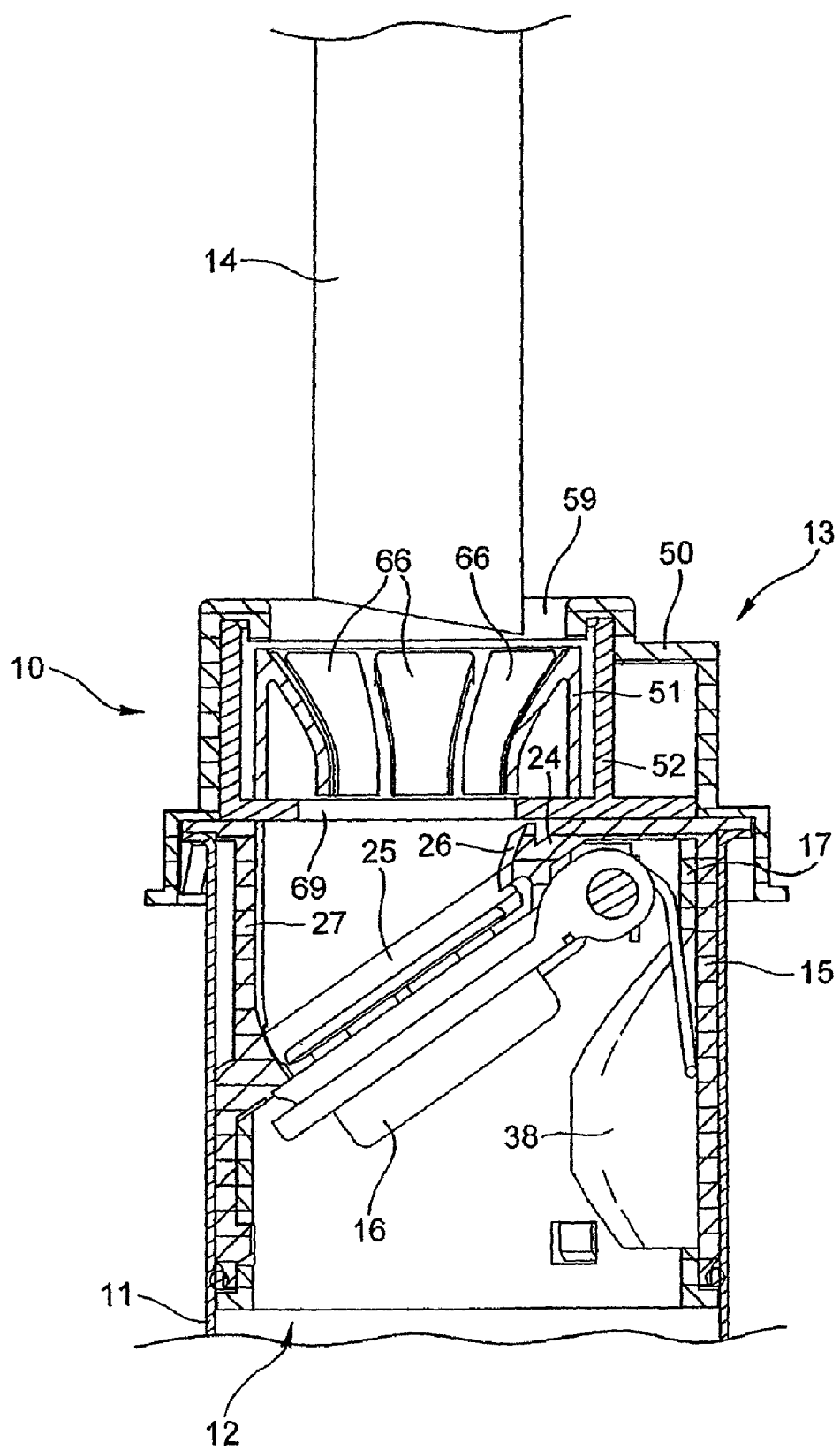
Figure 6:
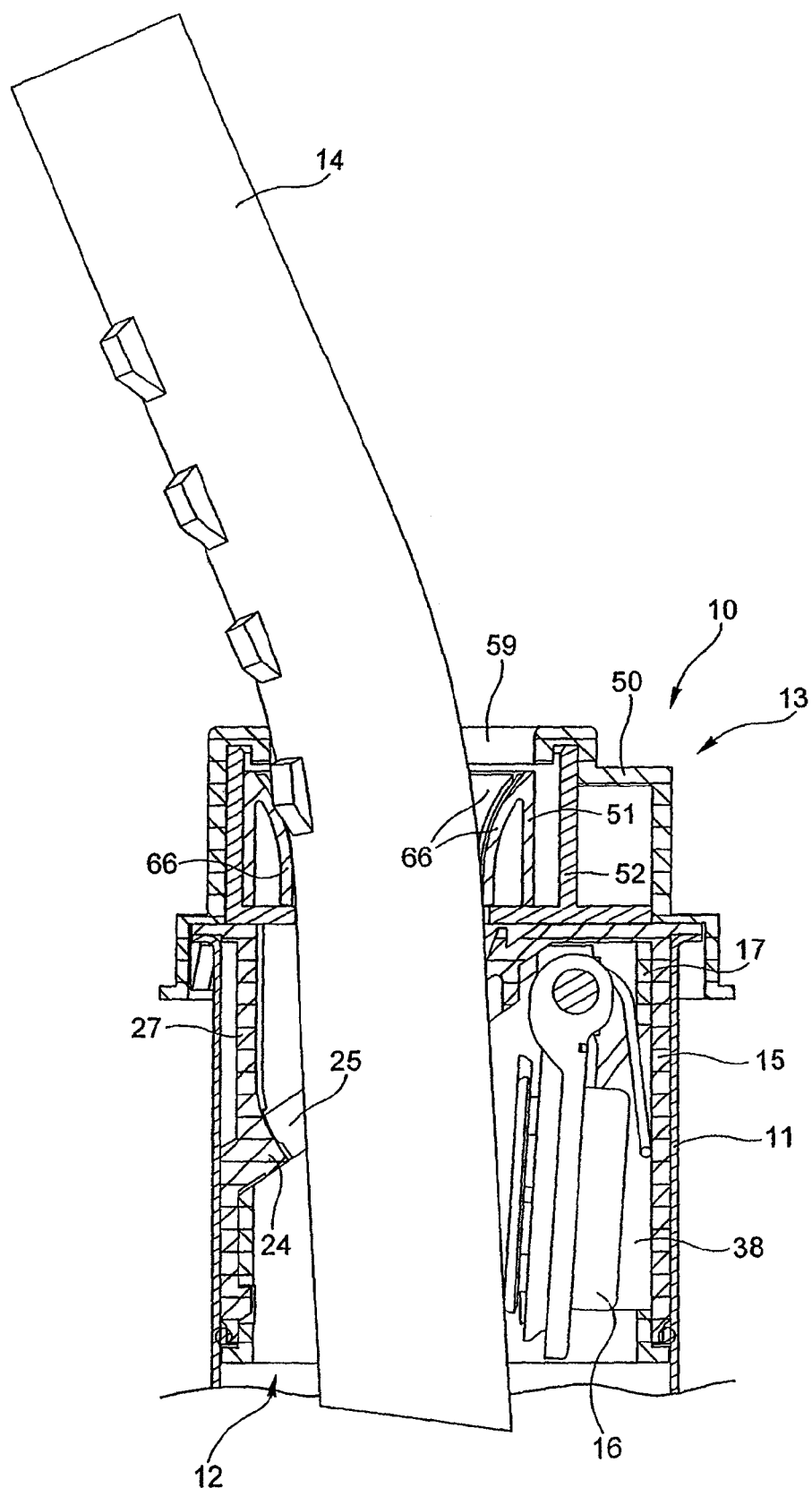

FIGS. 3 and 4 are perspective views, taken from different angles, of the annular shell belonging to the access assembly comprised by the head illustrated in FIGS. 1 and 2; and FIGS. 5 and 6 are similar views to FIG. 1 showing the extreme steps of the movement of thrusting into the filler head of a spout at the end of a fuel supply nozzle.

The filler head 10 illustrated in the drawings is provided to be mounted on an end of a filler pipe 11 (FIGS. 1, 5 and 6) for fuel, here diesel, of a vehicle tank (not shown) disposed at the other end of the pipe 11 (only a portion of the pipe 11 situated in the neighborhood of the head 10 is shown).

The head 10 comprises an obturating assembly 12 and an access assembly 13.

In the operating configuration illustrated in FIGS. 1 and 5, the head 10 obturates the pipe 11 whereas, as can be seen in FIGS. 5 and 6, by a simple thrusting movement starting from the operating configuration, the head 10 allows the passage of the spout 14 of a supply nozzle for an appropriate fuel, the fuel being diesel here, through assembly 13 and then assembly 12, in order to reach the filling position illustrated in FIG. 6, in which the distal end of the spout 14 communicates with the interior space of the pipe 11.

The obturating assembly 12 is situated at the rear (the side which is seen downwards in the drawings) and is provided to be inserted into the end of the pipe 11, the access assembly 13 being itself disposed to the front of the head 10 (the side which is seen upwards).

The obturating assembly 12 will now be described in detail.

This assembly comprises a main body 15, a flap obturator 16, an obturator support 17, a hinge pin 18 of the obturator 16 and a return spring 19 for the obturator 16.

The main body 15 is of relatively rigid plastics material molded as a single piece. It has a side wall 20 the general form of which is tubular with a circular section. A rim 21 of generally annular form projects transversely outwardly at the front end of the wall 20. Within the side wall 20 a separating wall 22 is disposed. The entirety of the periphery of the separating wall 22 is connected to the side wall 20.

Wall 22 has a transversely oriented section 23 and an obliquely oriented section 24.

Section 23 is disposed at the front end of the body 15, at the same level as the rim 21.

Section 24 is disposed between the section 23 and the side wall 20. The portion of section 24 situated remote from section 23 is approximately at mid-length of the body 15.

In section 24 there is provided an aperture 25 serving for the passage of the spout 14. No other aperture is provided in wall 22.

At the rear side, the perimeter of the aperture 25 serves as a seat for the obturator 16, which serves to close the aperture 25.

At the front side, a guide 26 in the form of an arch projects from a portion of the perimeter of the aperture 25 that is the closest to the front end of the body 15. The inner surface of the guide 26 is curved and is connected to the edge of the aperture 25.

The side wall 20 has an axially oriented internal rib 27, extending from the front end of the body 15 to a portion of the perimeter of the aperture 25 that is the furthest from that front end. Rib 27 and guide 26 are diametrically opposite.

The inner surface of rib 27 is curved and is connected to the edge of the aperture 25.

On the opposite side from rib 27, the side wall 20 has a recess 28, for molding considerations (uniformity of wall thickness).

On the inside, in the vicinity of the rear end, wall 20 has bosses 29 (FIGS. 1 and 5) for snap-fitting with the obturator support 17.

At the front and on the outside, body 15 comprises two diametrically opposite snap-fitting feet 29', which are able to flex inwardly into a housing in the form of a cut-out.

Feet 29' serve for the mutual snap-fitting of the assembly 12 and of the pipe 11: in the latter, to accommodate feet 29' two rectangular windows are provided (not visible in the drawings) in the vicinity of the front end.

An annular recess 30 is formed on the outside in the side wall 20, situated at the rear end of body 15.

Recess 30 serves to house the O-ring seal 31, which is provided to be disposed between the body 15 and the pipe 11.

This obturator support 17 is of relatively rigid plastics material molded as a single piece. It has a side wall 32 the general form of which is tubular with a circular section. A rim 33 of generally annular form projects transversely outwardly at the rear end of the wall 32.

The front end of the support 17 is formed like the wall 22 of body 15: the front edge of the side wall 22 has a transversely oriented portion 34 and an obliquely oriented portion 35, portion 34 being formed as the perimeter of portion 23 of wall 22 whereas portion 35 is formed like the perimeter of portion 24 of wall 22.

On the inside of wall 32, in the vicinity of portion 34 of its front end, two diametrically opposite bosses 36 project. In each boss 36 there is formed a hole 37 which also passes through the side wall 32.

The holes 37 are aligned along a chord close to the periphery of the side wall 32.

An opening 38 of relatively large dimensions is formed in the side wall 32 in a position overhung by the bosses 36.

Windows 39 are formed near the rim 33 for receiving a boss 29 of the body 15.

The obturator 16 comprises a closure 40 of relatively rigid plastics material molded in one piece and an O-ring 41 of elastomer plastics material molded in one piece.

The closure 40 has the general form of a circular plate. From its lateral surface an annular rim 42 projects of which each end is connected to a respective lug 43, which lugs 43 are disposed parallel to each other and each have a hole 44, which holes 44 are aligned.

At the front of the rim 42 an annular groove is provided receiving the seal 41.

The hinge pin 18 is of steel here. Its general form is that of a small rod of circular section.

The spring 19 is of spring steel here. It comprises a helical central portion 45 from which project, on one side, a hair pin portion 46, and, from the other side, two arms 47.

In the assembled state, hinge pin 18 is disposed in the holes 37 and 44 as well as inside the helical portion 45 of the spring 19, which portion 45 is disposed between the lugs 43, each lug 43 being disposed against a boss 36, the portion 46 of the spring 19 being disposed at opening 38 and bearing by its end on the wall 20 whereas the arms 47 are disposed against the rear face of the rim 42.

Once the obturator 16, the support 17, the hinge pin 18 and the spring 19 have been thus assembled, the support 17 is engaged in the main body 15, from the rear, until the front end (edges 34 and 35) of the wall 32 arrives against the rear face of the separating wall 22 and until the bosses 29 engage within the windows 39.

The support 17 and the body 15 are then connected to each other, the spring 19 applying the obturator 16 against the wall 22, the seal 41 more particularly bearing on the perimeter of the aperture 25.

The access assembly 13 will now be described.

This assembly comprises a cover 50, a shell 51 for resisting the withdrawal of the spout and a shell support 52.

The cover 50 is of relatively rigid plastics material molded as a single piece. It comprises a side wall 53 the general form of which is tubular with a circular section. From the rear side, the side wall 53 connects to a skirt 54 of generally stepped form.

Skirt 54 comprises a transversely oriented wall 55, an axially oriented wall 56 and a transversely oriented rim 57. Rim 57 is disposed at the rear end of the cover 50. The wall 56 is disposed between the rim 57 and the wall 55, the latter being disposed between the wall 56 and the wall 53.

At the front, wall 53 connects to a generally transversely oriented wall 58, having a circular aperture 59 surrounded by a bead 60.

Side wall 53 and skirt 54 are coaxially disposed to each other. Aperture 59 is eccentric with respect to side wall 53. The outline of bead 60 is of smaller diameter than that of the wall 68, with a point of tangency between their two outlines, such that there is a portion 61 of the wall 58 of crescent shape disposed between the bead 60 and the side wall 53.

In wall 56 of skirt 56 there are formed snap-fitting detents 62.

Shell 51 is of relatively rigid plastics material molded as a single piece. It comprises a side wall 65 the general form of which is tubular with a circular section and flexible tabs 66 disposed within the side wall 65.

As can be seen more particularly in FIGS. 3 and 4, the tabs 66 form a funnel-shaped assembly which, at its major diameter, on the outside, connects to the front end of the side wall 65 whereas the minor diameter is free and is situated at the same level as the rear end of the side wall 65.

Tabs 66 are separated from each other by radially oriented slots, here spaced apart angularly by 45° (the illustrated embodiment comprises eight tabs 66).

Each tab has a uniform or approximately uniform thickness between its free end (rear end) and its end attached to the side wall 65 (front end), the side wall 65 having a similar thickness.

It will be noted that the minor diameter of the funnel-shaped assembly formed by the tabs 66 is, on the inside, less than the outer diameter of the spout 14 of the type which the filler head 10 is provided for cooperating with, being here the spout of a diesel supply nozzle.

On the other hand, the major diameter of the funnel-shaped assembly formed by the tabs 66 is greater than the outer diameter of that spout 14.

Thus, thrusting in of the spout 14 from the front to the rear causes flexing of the tabs 66, which move apart from each other to allow the spout 14 to pass.

When spout 14 is then imparted with a movement of withdrawal (rear to front), the tabs 66 are moved by the spout and press strongly against it, so producing a braking effect to the withdrawal of the spout 14.

The support 52 is of relatively rigid plastics material molded as a single piece. It comprises a tubular side wall 67 of circular section and a transverse wall 68 connecting to the rear end of the side wall 67.

The outline of the wall 68 is circular and of greater diameter than that of the wall 67, these two walls being off-center with respect to each other, with a point of tangency between their two outlines, such that wall 68 presents a crescent shape outside wall 67.

The portion of the wall 68 situated within wall 67 has a central aperture 69 slightly larger than the outer diameter of the spout 14 (see FIG. 6).

Within the bead 60 of the cover 50 there is provided a groove 70 for receiving the front end of the wall 67.

In the assembled state of assembly 13, the shell 51 is disposed in the support 52, which support 52 is disposed in the cover 50, the bead 60 and the side wall 67 being coaxially disposed, wall 68 being located at the level of wall 55 of the skirt 54 (see in particular FIG. 1).

The diameter of the aperture 59 corresponds to the major diameter of the funnel-shaped assembly formed by the tabs 66.

The diameter of the side wall 53 of the cover 50 corresponds to the diameter of the side wall 20 of the main body 15, which corresponds to the inner diameter of the pipe 11.

The inner diameter of the wall 67 is greater than the outer diameter of the wall 65. The diameter of the aperture 69 is smaller than the inner diameter of the wall 65 and greater than the inner diameter of the portion of minor diameter of the funnel-shaped assembly formed by the tabs 66.

Thus, shell 51 can be disposed in support 52 with the rear end of wall 65 bearing on the portion of wall 68 situated within wall 67 and with the portion of minor diameter of the funnel-shaped assembly facing aperture 69.

The play then existing between the outer surface of wall 65 and the inner surface of wall 67 enables the shell 51 to be positioned appropriately when it cooperates with a spout 14 (see FIG. 6).

For its assembly with head 10, pipe 11 comprises, at its front end, an annular rim 71 of the same diameter as the annular rim 21 of the main body 15.

The inner diameter of the side wall 56 of the skirt 54 of the cover 50 is slightly greater than the diameter of the annular rims 21 and 71.

In the assembled state of head 10, support 52 bears by its wall 68, on the front end of the main body 15 whereas the cover 50 bears on that same end by the wall 55 of the skirt 54.

In the assembled state of the filler head 10 and pipe 11, the front face of the rim 71 bears against the rear face of the rim 21, the withdrawal of the pipe 11 being prevented by the snap-fitting detents 62, which abut with the rear face of rim 71.

The cooperation between the supply spout 14 and the filler head 10 will now be described with the aid of FIGS. 5 and 6.

Spout 14 penetrates the head 10 via the aperture 59, of which the diameter is greater than that of the spout 14 and similar to the diameter of the major diameter end of the funnel-shaped assembly formed by the tabs 66 of the shell 51.

The funnel-shaped assembly guides the spout 14 towards the aperture 69 of the support 52 and, since the minor diameter of the funnel-shaped assembly is smaller than the diameter of the spout 14, the tabs 66 deform by flexing such that the minor diameter portion of the funnel-shaped assembly bears strongly around the spout 14 (see FIG. 6).

As indicated above, the play existing between the shell 51 and the support 52 enables the shell 51 to be positioned optimally whatever the orientation of the spout 14.

Once the distal end of the spout 14 has passed through the aperture 69, it encounters the guide 26 or the rib 27 (according to the orientation of the spout), and finally comes to meet the obturator 16, which is then driven by the spout 14 to flap rearwardly and outwardly until it is fully disposed laterally to spout 14 which may then go beyond the obturator 16 and reach the filling position illustrated in FIG. 6.

It will be observed that apertures 59, 69 and 25 being eccentric with respect to pipe 11 enables a space to be cleared laterally of spout 14 to accommodate the obturator 16 in the open position.

Due to the fact that the separating wall 22, and more particularly its section 24, is obliquely disposed, the angular travel of the obturator 16 between the obturating position (FIG. 5) and the freeing position (FIG. 6) is relatively reduced, such that the force to exert at the end of the introduction of the spout 14 is also reduced (the returning couple provided to the obturator 16 by the spring 19 is proportional to the angle through which the obturator 16 flaps).

It will be observed that the opening 38 has sufficiently large dimensions to enable the closure 40 of the obturator 16 to be accommodated there, which is favorable to the compactness of the head 10.

When withdrawal of the spout 14 from the filler head 10 is performed, the spout first of all slides along the obturator 16, and then the latter acts on the distal end of that spout. A force in the direction of withdrawal is thus exerted relatively abruptly on the spout 14.

The rubbing of the tabs 66 against the spout gives a braking effect which slows the movement of withdrawal of the spout and avoids it being ejected abruptly.

In a variant not shown, the diameters of the different members through which the fuel supply spout passes are different, in order to be able to cooperate with a spout of different diameter, in particular a spout of smaller diameter provided for distributing unleaded gasoline.

In the example illustrated, the angular offset between the orientation of the obturator 16 in the obturating position and the transverse orientation is of the order of 35°, but in variants not illustrated, that offset is different, or even no offset is provided.

In other variants not shown, the materials of certain members are different, the hinge pin 18 being for example replaced by a hinge pin of plastics material; the arrangement of certain members is different, the wall as at 22 being for example entirely obliquely oriented, the end of minor diameter of the funnel-shaped assembly formed by the tabs as at 66 being for example situated at a level different from the rear end of the wall 65, the inner surface of the rib as at 27 being for example straight rather than curved; and/or the association of the different members is made differently, the access assembly being for example joined to the obturating assembly by ultrasonic welding rather than by snap-fitting.

Numerous other variants are possible according to circumstances, and in this connection it is to be noted that that the invention is not limited to the examples described and shown.

The invention claimed is:

1. A head for a fuel filler pipe of a vehicle, the head comprising an obturating assembly, the obturating assembly further comprising:
    a body having an aperture for passage to said pipe of a fuel supply spout of predetermined outer diameter;
    an obturator movable with respect to said body, able to assume an obturating position in which it conceals said passage aperture and a freeing position in which it does not conceal said passage aperture, said obturator flapping rearwardly and outwardly between said obturating position and said freeing position, said obturator being elastically urged towards said obturating position, said obturator being adapted to be driven by said spout from the obturating position to the freeing position when said spout meets the obturator during a thrusting movement of the spout into the head; and
    an access assembly having a shell through which the spout must pass before reaching the obturator, said shell having a plurality of flexible tabs generally forming an assembly of funnel shape of which the minor diameter is less than said outer diameter of said spout and of which the major diameter is greater than said outer diameter of said spout so that the minor diameter portion of the assembly of funnel shape bears snugly around the spout;
    wherein the obturator in the obturating position is obliquely disposed with respect to the thrusting movement of the spout, whereby an angular travel of the obturator between the obturating position and the freeing position is reduced; and
    wherein the shell is disposed in the access assembly with a radial play configured to allow the shell to be appropriately positioned when it cooperates with the spout.

2. A head according to claim 1, wherein said shell comprises a side wall the general form of which is tubular with a circular section, said flexible tabs being attached at the major diameter end of the funnel-shaped assembly which they form.

3. A head according to claim 2, wherein the minor diameter end of the funnel-shaped assembly formed by said tabs is at the same level as the rear end of said side wall.

4. A head according to claim 2, wherein said flexible tabs are connected to said side wall exclusively at the major diameter end of said funnel-shaped assembly.

5. A head according to claim 2, wherein each said flexible tab is of substantially constant thickness, said side wall having a similar thickness.

6. A head according to claim 1, wherein said access assembly further comprises a cover and a shell support, with, in the assembled state of the access assembly, said shell being disposed in said support and with said support being disposed in said cover, the major diameter end of said funnel-shaped assembly formed by said flexible tabs facing an aperture of said cover whereas the minor diameter end of said funnel-shaped assembly faces an aperture of said shell support, the latter aperture being adapted to allow the passage of said spout.

7. A head according to claim 6, wherein the radial play is between said shell and said shell support.

8. A head according to claim 6, wherein said cover comprises at the rear a skirt of step form provided with tongues for snap-fitting onto at least one of said access assembly or pipe.

9. A head according to claim 1, wherein said body comprises a separating wall disposed within a side wall.

10. A head according to claim 9, wherein said separating wall has a periphery connected in entirety to said side wall.

11. A head according to claim 9, wherein the general form of said side wall is tubular with a circular section.

12. A head according to claim 1, wherein said body has guide means for guiding said spout towards said passage aperture.

13. A head according to claim 12, wherein said guide means, comprise at least one member projecting from the perimeter of said passage aperture towards the front end of said body.

14. A head according to claim 13, wherein a said member projects from a portion of the perimeter of said passage aperture that is the closest to the front end of said body.

15. A head according to claim 13, wherein a said member projects from a portion of the perimeter of said passage aperture that is the furthest from the front end of said body.

16. A head according to claim 13, wherein at least one said member has an inner surface connected to the edge of said passage aperture.

17. A head according to claim 1, wherein it further comprises an obturator support engaged within and fixed to said body, said support being provided with means for flap mounting of said obturator.

18. A head according to claim 17, wherein said flap mounting means are disposed in the vicinity of the front end of the support and are aligned with a chord close to its periphery.

19. A head according to claim 18, wherein said support has an opening in line with said mounting means adapted to house a closure which the obturator comprises.

20. A head according to claim 17, wherein said flap mounting means of the obturator comprise two bosses and two apertures provided in said bosses and in a side wall of said support.

21. A head according to claim 17, wherein said body comprises a separating wall disposed within a side wall; and in that the front end of said support is formed like said separating wall.

22. A head according to claim 17, wherein said obturator comprises lugs for flap mounting, and in that a hinge pin is engaged in said flap mounting means of said support and in said lugs, and in that a helical central portion of a spring is disposed around said hinge pin between said lugs, respective projecting portions of said spring bearing respectively on said obturator and on said body.

23. A head according to claim 17, wherein said body and said support have mutual snap-fitting means.

\* \* \* \* \*